US012384184B2

(12) United States Patent
Weber et al.

(10) Patent No.: US 12,384,184 B2
(45) Date of Patent: Aug. 12, 2025

(54) PRINTING PROCESS FOR A METAL CONTAINER AND PRINTER FOR PRINTING ON A METAL CONTAINER

(71) Applicant: Hinterkopf GmbH, Eislingen/Fils (DE)

(72) Inventors: Joachim Weber, Bad Ditzenbach (DE); Ulrich Oberacker, Eislingen (DE); Joachim Schulz, Deggingen (DE); Tobias Mayer, Esslingen (DE); Philipp Steiner, Deggingen (DE)

(73) Assignee: Hinterkopf GmbH, Eislingen/Fils (DE)

( * ) Notice: Subject to any disclaimer, the term of this patent is extended or adjusted under 35 U.S.C. 154(b) by 297 days.

(21) Appl. No.: 17/888,548

(22) Filed: Aug. 16, 2022

(65) Prior Publication Data

US 2023/0058773 A1 Feb. 23, 2023

(30) Foreign Application Priority Data

Aug. 18, 2021 (EP) .................................... 21191856

(51) Int. Cl.

| | |
|---|---|
| ***B41M 5/00*** | (2006.01) |
| ***B41J 3/407*** | (2006.01) |
| ***B41J 3/413*** | (2006.01) |
| ***B41J 11/00*** | (2006.01) |

(52) U.S. Cl.

CPC ........ *B41M 5/0011* (2013.01); *B41J 3/40733* (2020.08); *B41J 3/413* (2013.01); *B41J 11/0015* (2013.01); *B41M 5/0058* (2013.01); *B41M 5/0082* (2013.01); *B41M 5/0088* (2013.01)

(58) Field of Classification Search

CPC .............. B41M 5/0011; B41M 5/0058; B41M 5/0088; B41M 5/0082; B41J 3/413; B41J 3/40733; B41J 11/0015

See application file for complete search history.

(56) References Cited

U.S. PATENT DOCUMENTS

2013/0019566 A1 1/2013 Schach
2018/0164719 A1* 6/2018 Stowitts .................. B41J 3/413

FOREIGN PATENT DOCUMENTS

EP 2810994 A1 * 12/2014 ................ B41J 2/01
JP 2000218214 A * 8/2000 ............. B05D 3/142
WO 2020/053709 A1 3/2020

* cited by examiner

*Primary Examiner* — Yaovi M Ameh
(74) *Attorney, Agent, or Firm* — Hoffmann & Baron, LLP

(57) ABSTRACT

A printing process for a metal container includes the steps: Heating the metal container, in particular formed as a metal bottle ready for filling, to a pre-treatment temperature lying in an interval between 100 degrees Celsius and 250 degrees Celsius, cooling the metal container to a temperature below 100 degrees Celsius, locally activating a printing zone, formed on an outer surface of the metal container to increase a surface energy of the printing zone and/or locally heating the printing zone to a printing temperature which is in an interval between 30 degrees Celsius and 70 degrees Celsius, printing the printing zone with a printing method.

12 Claims, 1 Drawing Sheet

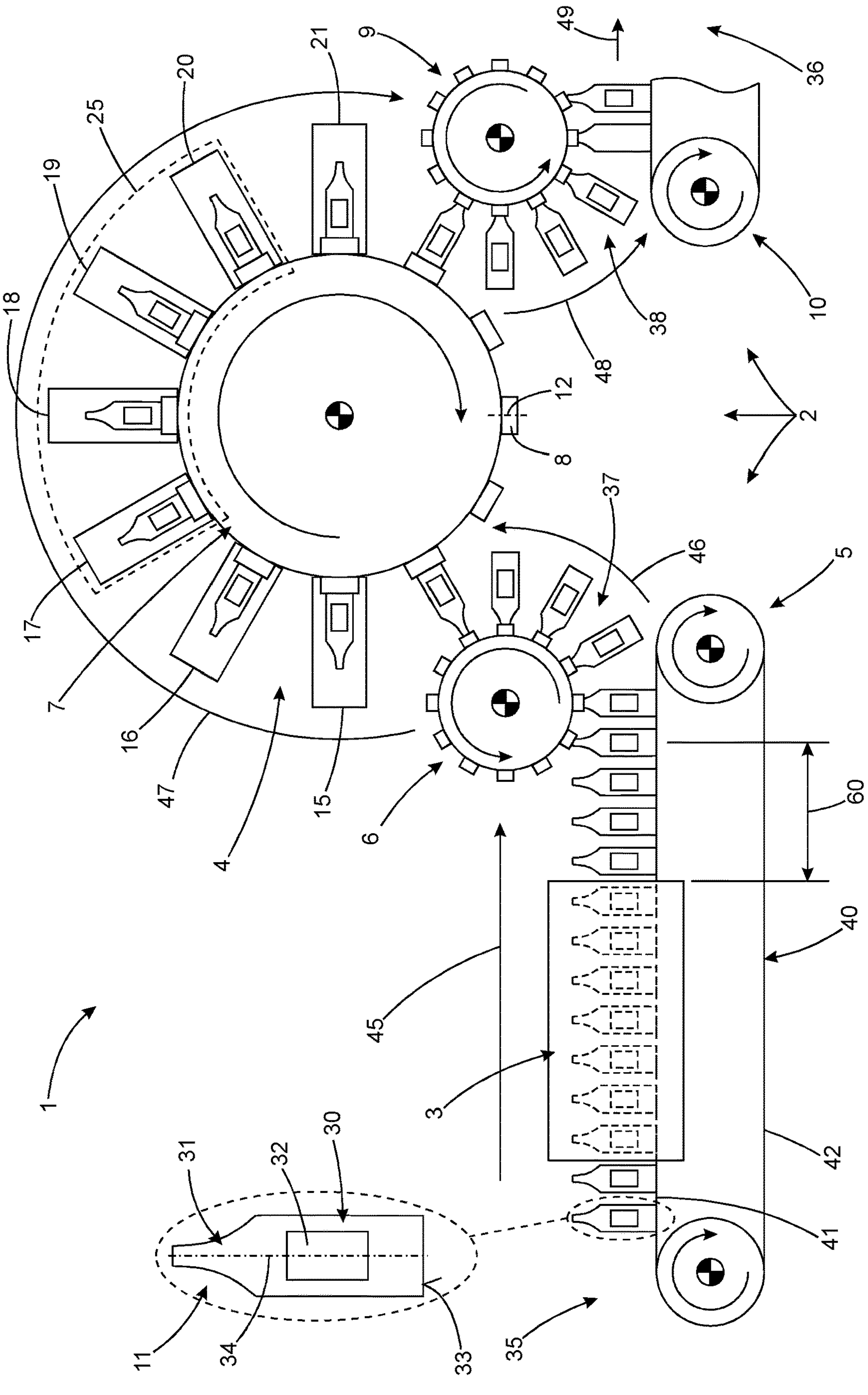
1
2
3
4
5
6
7
8
9
10
11
12
15
16
17
18
19
20
21
25
30
31
32
33
34
35
36
37
38
40
41
42
45
46
47
48
49
60

PRINTING PROCESS FOR A METAL CONTAINER AND PRINTER FOR PRINTING ON A METAL CONTAINER

BACKGROUND OF THE INVENTION

The invention relates to a printing process for a metal container and a printer for printing on a metal container.

Such printing processes and printers set up for carrying out the printing process are used, for example, in the field of mass production of beverage cans and aerosol cans. Depending on the application, contact or non-contact printing processes are used. In many cases, printing on the outer surface of the metal container takes place at a time when the metal container is still present as a metal container blank which has a circular cylindrical outer surface and is formed into the desired geometry by plastic deformation in a deformation process to be carried out after printing.

SUMMARY OF THE INVENTION

The task of the invention is to specify a process as well as a printer for printing on a metal container which, taking into account practical framework conditions, can also be used for already formed metal containers.

This task is solved for a printing process with the following steps: Heating of the metal container, in particular in the form of a metal bottle ready for filling, to a pre-treatment temperature which lies in an interval between 100 degrees Celsius and 250 degrees Celsius, cooling of the metal container to a temperature below 100 degrees Celsius, local activation of a printing zone, formed on an outer surface of the metal container to increase a surface energy of the printing zone and/or locally heating the printing zone to a printing temperature which is in an interval between 30 degrees Celsius and 70 degrees Celsius, printing on the printing zone with a printing method.

This printing process can also be used to print metal containers whose outer surface has a low surface energy and thus a low tendency for printing inks to adhere due to previous processing operations, since the process according to the invention causes an increase in the surface energy of the outer surface of the respective metal container and therefore increases the adhesion of the printing ink. It is of considerable importance here that the metal container is first heated to a pre-treatment temperature in an interval between 50 degrees Celsius and 250 degrees Celsius in order to bring about advantageous basic conditioning for the outer surface of the metal container.

Preferably, it is envisaged that the pre-treatment temperature is selected in an interval between 60 degrees Celsius and 130 degrees Celsius in order to achieve an advantageous compromise between efficient treatment of the surface to be printed and the lowest possible thermal stress for the coatings already applied to the metal container, i.e. typically an interior coating and a base coating.

After cooling the metal container to a temperature below 100 degrees Celsius, local activation of a printing zone and/or local heating of the printing zone taking place, preferably immediately before the printing process are carried out.

The activation of the printing zone by a suitable activation process is explicitly aimed at increasing the surface energy of the printing zone. Accordingly, a locally effective activation process is used for this purpose.

The local heating of the printing zone serves in particular to improve the ink flow for the printing ink applied to the outer surface of the metal container, while the change in the surface energy of the metal container is less of a priority here. Preferably, heating of the printing zone takes place immediately before the printing process is carried out, an advantageous temperature interval for the printing being in a range from 40 degrees Celsius to 60 degrees Celsius.

Advantageous further developments of the invention are the subject of the subclaims.

It is expedient that the step of heating the metal container to the pre-treatment temperature is accompanied by a change in a local distribution of a lubricant layer applied or distributed on the outer surface of the metal container, in particular of a lubricant layer distributed on the outer surface of the metal container, in particular a wax layer or a mineral oil layer, which has been applied in order to support out a plastic deformation of the metal container at least in certain areas. In principle, it can be assumed that metal containers which are at least almost completely, in particular completely, finished with regard to their final structure and geometry and thus require at least no further substantial plastic deformation are provided with a lubricant layer, in particular in the region of the preceding deformation process. This lubricant layer is required to support out the respective plastic deformation process and cannot be removed from the outer surface of the metal containers in an economically and technically reasonable manner, particularly in the case of mass production of metal containers.

Accordingly, the objective of heating the metal container to the pre-treatment temperature is to change the local distribution of the lubricant, especially in the printing zone. By way of example, the aim is to homogenize the layer thickness of the lubricant layer so that there are no significant layer thickness differences for the lubricant layer, particularly in the printing zone. Such differences in layer thickness result in locally different adhesion of the printing ink and/or in a different color effect of the printing ink and thus may affect the quality of the printing process.

Alternatively, it may be envisaged to achieve a local concentration of the lubricant to, preferably microscopic, lubricant droplets in the course of changing the local distribution of the lubricant. In this case, it is assumed that surface areas between the very small and finely distributed lubricant droplets are at least largely, in particular completely, free of lubricant and the distribution and size of the lubricant droplets can be adjusted by the specific selection of the pre-treatment temperature in such a way that only minor impairments, in particular none that can be seen with the naked eye, occur in the printed image with which the printing area is provided.

If necessary, at least partial evaporation of the lubricant can be achieved by heating, so that a change in the local distribution and/or concentration of the lubricant can be achieved in this way.

For example, in the case of a design of the metal container as a beverage can blank in that region which is later used for flanging on the lid, or in the case of a design of the metal container as a beverage bottle in the tapered neck region, a large layer thickness of the lubricant is to be assumed, since the plastic deformation which is to be supported by the lubricant was carried out there. In contrast, in the adjacent container area, which typically also includes the printing zone, a smaller layer thickness of the lubricant layer is to be assumed, whereby the lubricant layer in the container area is not caused by a direct lubricant application but rather by a carryover of lubricant from the deformation zone of the metal container and can thus exhibit considerable inhomogeneity with regard to the layer thickness of the lubricant layer.

In a further embodiment of the method, it is provided that the metal container is provided with a basecoat prior to performing the plastic deformation process. The basecoat is that coating which is applied to the metal container in order, on the one hand, to protect it from environmental influences and, on the other hand, to bring about advantageous surface properties for the metal container when the plastic deformation process is carried out, in particular with regard to frictional properties of the metal container with respect to the deformation tools used in the deformation process. In many applications, the basecoat is also the coating that is applied as the last coating before the metal container is finished and thus significantly determines the properties of the outer surface of the metal container. Typically, the base coat has high abrasion resistance, high scratch resistance, and high resistance to chemical substances, and can also be used as a decorative element. It may also be envisaged to provide the metal container, which is already covered with the basecoat with an additional tubular coating which is slid onto the metal container and then shrunk on, although in this case, in contrast to printing the metal container, there are undesirable side effects such as, for example, poorer reusability/recyclability.

Preferably, the printing of the printing zone is carried out using a non-contact inkjet printing process. This printing process is also known as the digital printing process and, in contrast to a printing plate with a fixed print image, enables printing with an individual print image for each metal container. Accordingly, the inkjet printing process is of particular interest for small batch sizes with a high degree of individualization, but because of the printing ink used and the technical conditions for metering the printing ink, it requires compliance with tightly defined conditions for the surface quality of the printing zone. These conditions are difficult to maintain, particularly in the case of ready-to-fill metal containers, due to the lubricant layer that is usually present, so that pre-treatment in accordance with the process and activation immediately before printing and/or heating immediately before printing must be regarded as a basic prerequisite for high-quality printing.

In a further embodiment of the process, it is provided that the printing zone is provided with a coating after the printing process has been carried out. This coating serves in particular to provide mechanical protection for the printed image applied in the printing zone. Furthermore, the coating applied at least in the printing zone also ensures protection of the printed image against environmental influences, for example against moisture.

It is advantageous if the coating is applied, in particular exclusively, to the metal container in the printing zone using a non-contact digital printing process. Such a coating is also referred to as spot coating and can preferably be carried out on the same digital printing machine used to apply the printed image to the printing zone. However, the layer thickness for the coating is limited when using the digital printing process, so that this coating method is preferably considered for metal containers that will not be exposed to higher mechanical and/or chemical influences until they are used.

In an alternative approach, it is envisaged that the coating is applied to the outer surface of the metal container using a spray process. The application of this coating to the metal container is preferably provided away from the digital printing machine used to apply the printed image to the printing zone. The use of a separate sprayer for carrying out the spraying process is advantageous for metal containers that are stored and transported under rough conditions of use until they are used, since a more robust protection for the outer surface of the metal container can be ensured due to the greater layer thickness of the coating.

Preferably, it is provided that the heating of the metal container to the pre-treatment temperature is carried out with a holding time of at least 60 seconds, preferably of at least 120 seconds, in particular of at least 240 seconds. In particular the holding time is within an interval of 30 to 60 seconds or within an interval of 60 to 120 seconds or within an interval of 120 to 240 seconds. The holding time is understood to be the time period within which the metal container reliably reaches the desired target temperature, which is the interval between 50 degrees Celsius and 250 degrees Celsius. The holding time depends on the size and geometry of the metal containers as well as on the type and quantity of lubricant used, for example wax or mineral oil. Furthermore, it must be taken into account whether the pre-treatment is carried out in a continuous process, for example a continuous furnace, or batch wise, i.e. always with a predefined number of metal containers to be heated at the same time.

Preferably, it is provided that the step of cooling the metal container after the step of heating it to the pre-treatment temperature, which is carried out in a pre-treatment chamber, is carried out by transporting it by a conveyor from the pre-treatment chamber to a printing machine in which the printing of the printing zone is carried out. Here it is assumed that after leaving the pre-treatment chamber the metal container has to cover a certain conveying distance before it can be provided to the printer arranged downstream along the conveying path after the pre-treatment chamber, and that this conveying distance is designed in such a way that the desired cooling of the metal container can be achieved. Here it is assumed that the heat absorbed by the metal container is radiated into the environment. If necessary additional coolers, for example fans, can also be provided in order to effect the cooling of the metal container.

According to a further modification of the process, it is provided that the local activation of the printing zone is carried out with an activation process from the group: corona treatment, plasma treatment, gas flame, infrared irradiation. In a corona treatment, electric charge transport takes place between an electrode and the metal container serving as a counter-electrode in an alternating electric field by ionization of an electrically non-conductive gas, for example ambient air. In a plasma treatment, electric charge transport takes place between an electrode and the metal container serving as a counter-electrode in an alternating electric field of an electrically conductive gas. When a gas flame is used for local activation of the printing zone, the activation result can be influenced by suitable selection of the fuel gas and/or the oxygen content. Infrared irradiation can optionally be achieved by using an infrared gas burner or an electrically operated infrared source.

In a further embodiment of the process, it is provided that the heating of the printing zone takes place together with the activation, in particular results from the activation. For example, when a gas flame is used for local activation of the printing zone, in addition to the oxidation effect caused by the open flame, heating of the printing zone inherently occurs due to the combustion process for the burning gas.

It is advantageous if the metal container for printing in the printing zone is pushed onto a receiving mandrel with a container opening or is gripped and fixed at a base area. It is advantageous to slide the metal container onto a receiving mandrel if a cross-section of a container opening is the same size or only slightly smaller than a cross-section of the container adjoining it, as is the case, for example, with beverage cans. Gripping and fixing the metal container at the bottom area is advantageous if the metal container has a typical bottle shape with a slender bottle neck, and enables a large contact area between the gripper and the metal container and thus stable and precise fixing of the metal container formed in the shape of a bottle, as is required for carrying out the printing process. In contrast, gripping the metal container, which may be a beverage bottle, for example, in the neck area, which has a significantly smaller cross-section than the base area, would result in error-prone fixation of the metal container formed in the shape of a bottle. Gripping and fixing of the metal container formed in the shape of a bottle can be ensured either by frictional connection between the metal container and the gripping tongs and/or by applying vacuum to the bottom region of the metal container with the gripping tongs.

According to a second aspect, the task of the invention is solved with a printer for printing on a metal container. The printer comprises a conveyor for conveying metal containers along a conveying path, a pre-treatment chamber arranged along the conveying path and adapted for heating the metal container to a pre-treatment temperature which is in an interval between 50 degrees Celsius and 250 degrees Celsius, and with a printing machine arranged downstream of the pre-treatment chamber on the conveying path, which printing machine has an activator for a printing zone of the metal container and a printing unit, in particular designed as a digital printing unit, for printing on the printing zone of the metal container.

The conveyor can comprise different conveying means such as, for example, conveyor chains with pick-up rods, loading starwheels with vacuum trays, conveyor belts, guide rails, turret heads with pick-up mandrels. The conveyor is used to transport the metal containers from a loading station for the metal containers located upstream of the pre-treatment chamber to an unloading station located downstream of the press. The conveyor may also be designed to handle pallets on which a plurality of metal containers is received. Furthermore, in this case, it can be provided that the conveyor is designed for a separation of the metal containers accommodated on a pallet for a subsequent linear transport.

The pre-treatment chamber may be designed, for example, as a closable furnace for pre-treatment of metal containers in batches. In this case, it can be provided that the conveyor first feeds the metal containers delivered on pallets into the pre-treatment chamber and, after carrying out the pre-treatment, discharges them from the pre-treatment chamber again in order to then effect separation and further linear transport of the metal containers in the direction of the printer. Alternatively, the pre-treatment chamber can be designed as a continuous furnace through which the conveyor passes so that the metal containers can pass through the furnace section as a continuous row.

In a further embodiment of the printer, it is provided that the activator is designed for carrying out an activation process from the group: corona treatment, plasma treatment, gas flame, infrared irradiation.

In a further embodiment of the invention, it is provided that the pre-treatment chamber is designed as a continuous furnace and/or that the printer has a workpiece rotary table which is rotatably mounted on a machine frame and on which a plurality of receiving mandrels are arranged, each of which is designed for pushing on a metal container, or on which a plurality of gripping means are arranged, each of which is designed for gripping a bottom region of the metal container, and that the activator and the printing unit are arranged along an arcuate conveying path determined by the receiving mandrels or the gripping means.

When a continuous furnace is used for pre-treating the metal containers, it is advantageous if the metal containers are each conveyed at a distance from adjacent metal containers even as they pass through the continuous furnace and also during subsequent onward transport to the printer, so that the homogenizing effect of the pre-treatment, which servers to distribute the lubricant layer applied to the outer surface, is not questioned again by undefined mechanical contacts between adjacent metal containers.

The printer, designed in particular as a digital printer, comprises a workpiece rotary table which is rotatably mounted on a machine frame and is coupled to a drive which is designed to provide a rotary step movement on the workpiece rotary table. On an outer circumferential surface or in the region of an outer circumference of the workpiece rotary table, receiving mandrels or gripping means are arranged at regular angular pitch, which are each designed for pushing on the metal container or for gripping a base region of a metal container. Preferably, it is provided that the receiving mandrels or the gripping means are aligned on the workpiece rotary table in such a way that center axes of the metal containers received therein are either aligned in radial direction or aligned parallel to a rotational axis of the workpiece rotary table. The rotary stepping motion of the workpiece rotary table conveys the pick-up mandrels or the gripping means and the metal containers received thereon along a circular arc-shaped conveying path. The printer comprises a plurality of work stations, at least one of which is designed as a printing unit, in particular as a digital printing unit, and which are arranged with respect to the receiving mandrels or the gripping means and the metal containers received thereon in such a way that processing of the respective outer surface of the metal containers is made possible by the work stations. Preferably, it is provided that the gripping means are designed for a non-positive and/or vacuum-based gripping force transmission to the metal containers.

BRIEF DESCRIPTION OF THE DRAWINGS

An advantageous embodiment of the invention is shown in the drawing. Here shows:

FIG. 1 a strictly schematic representation of a processing device, which comprises a conveyor, a pre-treatment chamber and a printer and is designed for printing on metal containers.

DETAILED DESCRIPTION

A processing device 1 shown in the single FIG. 1 is provided for printing on outer surfaces of metal containers 11, which metal containers 11 are realized purely exemplarily as metal bottles with a circular-cylindrical container section 30 and a bottle neck 31 which is tapered starting from the container section 30. The processing device 1 is used to print a printing zone 32 provided on the container section 30, which is of purely exemplary rectangular design. For example it is assumed that the metal container 11 is at least largely ready for filling with respect to its structure and geometry. In practice, this means that the metal container 11 is not subjected to further plastic deformation in the course of printing as well as after printing. Rather, the forming operations to be performed directly on the metal container 11 have already been performed before it is fed to the processing device 1. If necessary, it may be provided that after the printing of the metal container 11 as well as a transport of the metal container 11 to a filling device and the execution of the filling, for example with a soft drink, a closure such as, for example, a crown cap is applied to the open end region of the bottle neck 31, whereby a still minor plastic deformation of the metal container 11 may occur, which, however, does not lead to a substantial change in shape for the metal container 11.

Furthermore, for the following description of the processing device 1 and the printing process for metal containers 11 that can be carried out therewith, it is assumed that the metal containers 11 have already been provided with a base coat before plastic deformation processes are carried out. The base coat on the one hand contributes to a stabilization of the metal container 11 and on the other hand ensures, in a combination with the local lubrication on the container surface, favourable sliding friction properties for the deformation tools with which the plastic deformation of the metal container 11 is carried out. It is further understood that the metal container 11, in particular in the area of the bottle neck 31, is provided with a lubricant application not shown in detail, which also serves to reduce the sliding friction between the bottle neck 31 of the metal container 11 to be formed and the deformation tools not shown.

The processing device 1 comprises a conveyor 2, by means of which a transport of the metal containers 11 can be carried out starting from a loading position 35 to an unloading position 36, wherein the conveyor 2 comprises, purely by way of example, different conveyor types such as a first conveyor belt 5, a loading starwheel 6, an unloading starwheel 9 and a second conveyor belt 10.

Purely exemplarily, the first conveyor belt 5 comprises an endlessly circulating chain belt 40, the upper run 41 of which is guided in sections through a pre-treatment chamber 3 designed purely exemplarily as a continuous furnace, while a lower run 42 of the chain belt 40 is guided below the pre-treatment chamber 3. Exemplarily, it is provided that the metal containers 11 are placed on the upper run 41 of the first conveyor belt 5 at the loading position 35 in a manner not shown in more detail, spaced apart manually by an operator or automatically by an industrial robot or another feeding device. In this regard, it is provided that the metal containers 11 are placed on the upper run 41 of the first conveyor belt 5 with a contact surface which is flat or circular in shape and which is determined by the geometry of a bottom region 33 of the respective metal container 11 that is not shown in greater detail.

By way of example, it is provided that the metal containers 11 are each placed on the first conveyor belt 5 with spacing in a single row and are conveyed by the conveying movement of the first conveyor belt 5 along a first conveying path section 45, which is formed in a straight line, to a first transfer position 37. In this case, a first distance 60 between the end of the pre-treatment chamber 3 and the first transfer position 37 is adapted to a pre-treatment temperature in the pre-treatment chamber 3 and to a geometry of the metal containers 11 and to a conveying speed of the first conveyor belt 5 in such a way that the metal containers 11 are cooled down at the first transfer position 37 to such an extent that, during the subsequently provided feed of the metal containers 11 to the printer 4, only a small amount of heat is applied to the printer 4, which does not impair the functioning of the printer 4.

Purely by way of example, it is provided that at the first transfer position 37 a removal process for the metal containers 11 is carried out with the aid of the loading starwheel 6, which carries out a counterclockwise rotational movement as shown in FIG. 1 and grips the metal containers 11 at the bottle neck 31. Accordingly, the bottom area 33 of the metal container 11 is free and can be fixed to the workpiece rotary table 7 by the respective gripping means 8 in the course of a counterclockwise rotational movement of the workpiece rotary table 7 arranged adjacent to the loading starwheel 6, in particular using frictional forces and/or a vacuum. Subsequently, the metal containers 11 fixed to the workpiece rotary table 7 by means of the gripping means 8 are guided past a series of work stations 15 to 21 described in more detail below in the course of the clockwise rotary step movement of the workpiece rotary table 7 provided as shown in FIG. 1. Here, work stations 15 to 21 are adapted to the rotary step movement of the workpiece rotary table 7 and the arrangement of the gripping means 8 on the workpiece rotary table 7 in such a way that the metal containers 11 *j* are arranged exactly opposite the work stations 15 to 21 during the movement pauses of the workpiece rotary table 7.

By way of example, it is provided that the first work station 15 is designed as an optical inspection device, with the aid of which it can be checked whether the metal container 11 is correctly aligned in the gripping means 8. Furthermore, the optical inspection device of the first work station 15 can also be used to determine a rotational positioning of the metal container 11 about its longitudinal axis, which is not shown, in order to be able to carry out the activation and printing process for the metal containers 11 in the correct position relative to the printing zone 32. Here, it is assumed that each of the gripping means 8 is rotatably mounted on the workpiece rotary table 7 about a rotational axis 12, which is aligned in the radial direction and shown and is coaxial with a rotational symmetry axis 34 of the respective metal container 11, which is also described as a central axis. Accordingly, for carrying out the optical inspection by means of the first work station 15, it can be provided to rotate the metal container 11 about its rotational symmetry axis in order to thereby be able to determine the rotational orientation of the metal container 11.

In the course of the execution of a rotary step movement by the workpiece rotary table 7, the respective metal container 11 is moved from the first work station 15 to the second work station 16 so that it is arranged opposite the second work station 16 in the subsequent movement of the workpiece rotary table 7. The second work station 16 is also referred to as an activation station and includes an activator, not shown in more detail, for carrying out an activation process from the group: corona discharge, plasma discharge, gas flame, infrared irradiation.

Preferably, it is provided that the printing zone 32 is aligned as exactly as possible opposite the activator in order to achieve the maximum possible activation result for the printing zone 32 with the lowest possible energy input into the metal container 11. Depending on the selection of the activation method and on the design of the respective activator, it may be provided to keep the metal container 11 in a constant rotational position during the execution of the activation or to rotate it at least by a certain angular amount.

In the course of the next three rotational step movements, the metal container 11 is arranged opposite the third work station 17, the fourth work station 18 and the fifth work station 19, each of which has one or more digital printing heads, not shown, and which in their commonality form a digital printing unit 25. At each of these work stations 17 to 19, an ink application takes place in the printing zone 32 of the metal container 11. Exemplarily, it is provided that at each of the work stations 17 to 19 exactly one color, for example cyan, yellow, magenta, is delivered to the printing zone 32 in order to realize a multicolor printed image for the metal container 11. Depending on the design of the digital printing unit 25, it may also have fewer or more work stations with print heads.

After the printing of the printing zone 32 at the work stations 17 to 19, it is provided, purely by way of example, that the printing zone 32 is provided with a coating which ensures, on the one hand, mechanical protection for the printed image produced and, on the other hand, protection against aggressive media, for example liquids, for the printed image. For example, the sixth work station 20 is designed for contactless application of the coating in an inkjet printing process and therefore also comprises one or more print heads.

In the course of a further rotary step movement for the workpiece rotary table 7, the metal container 11 passes to the seventh work station 21, which is provided purely by way of example for a subsequent and additional curing of the printing ink applied in the preceding printing steps, wherein the work stations 17 to 19 of the digital printing unit 25 can, if necessary, also be equipped with radiation sources for curing the printing ink applied in each case at the work station 17 to 19.

With a further rotary step movement of the workpiece rotary table 7, the respective metal container 11 reaches an unloading position 36, in which an unloading starwheel 9 can grip the respective metal container 11 at the bottle neck 31 in order to remove it from the gripping means 8 and place it on the second conveyor belt 10.

Due to the use of the loading starwheel 6, the workpiece rotary table 7 as well as the unloading starwheel 9, a circular section-shaped second conveyor path section 46, a circular section-shaped third conveyor path section 47 as well as a circular section-shaped fourth conveyor path section 48 result, which is followed by a straight-line fifth conveyor path section 49 determined by the second conveyor belt 10. It is understood that instead of the above-described components of the conveyor 2, other components can also be used in order to be able to specify a different conveyor path 44 for the metal containers 11.

The implementation of the printing process for the metal container 11 can be described as follows in connection with the processing device 1: in a first step, a metal container 11, which is preferably designed ready for filling, is placed from a cardboard box or from a pallet, manually or by means of an automatic handling device, in particular an industrial robot, at the loading position 35 on the upper run 41 of the first conveyor belt 5, so that it is aligned in a straight line with further metal containers 11 already placed on the upper run 41.

As a result of the conveying motion of the first conveyor belt 5 along the first conveying path section 45, the metal container 11 is transported through the pre-treatment chamber 3, where it is heated to a predetermined pre-treatment temperature, which is in a range between 100 degrees Celsius and 250 degrees Celsius. Here, a temperature profile in the pre-treatment chamber 3, a conveying speed of the first conveyor belt 5, and a length of the pre-treatment chamber 3 are adjusted to the properties of the metal container 11 such that it is exposed to the pre-treatment temperature for a predetermined period of time, which is also referred to as the holding time, thereby achieving the desired homogenization of the lubricant layer.

After leaving the pre-treatment chamber 3, a at least predominantly passive cooling of the metal container 11 takes place, whereby the metal container 11 at the first transfer position 37 has a temperature with which an excessive heat input to the subsequent printing machine 4 is avoided. After the metal container 11 has been removed from the upper run 41 of the first conveyor belt 5 and fed to the gripping means 8 of the workpiece rotary table 7, the metal container 11 passes the work stations 15 to 21 in the course of the rotary step movements of the workpiece rotary table 7. First, the alignment of the metal container 11 with respect to the gripper 8 is checked, then the printing zone 32 of the metal container 11 is activated, and then the printing and subsequent coating of the printing zone 32 can be carried out in digital printing processes. Finally, the metal container 11 passes through the seventh and last work station 21, where a final curing of the pre-applied ink layers is performed. In a subsequent step, the metal container 11 is transferred at the second transfer position 38 to the unloading starwheel 9, which then deposits the metal container 11 on the second conveyor belt 10. The second conveyor belt 10 moves the metal container 11 to the unloading position 36, which is not shown in more detail, at which, for example, a manual or automated removal of the now completed metal container from the second conveyor belt 10 and an insertion of the metal container 11 into a transport box, which is not shown, or onto a pallet, which is not shown, can be carried out.

What is claimed is:

1. A printing method for a metal container comprising the steps:

heating the metal container to a pre-treatment temperature lying in an interval between 100 degrees Celsius and 250 degrees Celsius;

cooling the metal container to a temperature below 100 degrees Celsius;

locally activating a printing zone which is located on an outer surface of the metal container to increase a surface energy of the printing zone and/or locally heating the printing zone to a printing temperature which is in an interval between 30 degrees Celsius and 70 degrees Celsius; and printing on the printing zone with a printing method.

2. The printing method according to claim 1, wherein with the step of heating the metal container to the pre-treatment temperature, a change in a local distribution of a lubricant layer applied to the outer surface of the metal containers is carried out.

3. The printing method according to claim 2, wherein the metal container is provided with a base coat before a plastic deformation process for the metal container and the printing process are carried out.

4. The printing method according to claim 1, wherein the printing of the printing zone is carried out using a non-contact inkjet printing process.

5. The printing method according to claim 1, wherein the printing zone is provided with a coating after the printing process has been carried out.

6. The printing method according to claim 5, wherein the coating is applied to the metal container in the printing zone using a contactless digital printing process.

7. The printing method according to claim 5, wherein the coating is applied to the outer surface of the metal container using a spraying method.

8. The printing method according to claim 1, wherein the heating of the metal container to the pre-treatment temperature is carried out with a holding time of at least 60 seconds.

9. The printing method according to claim 1, wherein the step of cooling the metal container after the step of heating the metal container to the pre-treatment temperature, which is carried out in a pre-treatment chamber, is carried out by transporting the metal container with a conveyor from the pre-treatment chamber to a printing machine.

10. The printing method according to claim 1, wherein the local activation of the printing zone is carried out with an activation process from the group: corona treatment, plasma treatment, gas flame, infrared irradiation.

11. The printing method according to claim 10, wherein the heating of the printing zone is carried out together with the activation.

12. The printing method according to claim 1, wherein the metal container for printing in the printing zone is gripped and fixed at a bottom region.

* * * * *